(12) United States Patent
Penumadu (10) Patent No.: US 11,141,931 B2
(45) Date of Patent: Oct. 12, 2021

(54) SMART JOINT FOR SIMILAR AND DISSIMILAR MATERIALS INCLUDING POLYMERS, FIBER REINFORCED COMPOSITES, METALS, CONCRETE, WOOD BASED PRODUCTS, AND OTHER STRUCTURAL MATERIALS

(71) Applicant: University of Tennessee Research Foundation, Knoxville, TN (US)

(72) Inventor: Dayakar Penumadu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 227 days.

(21) Appl. No.: 16/314,470

(22) PCT Filed: Sep. 15, 2017

(86) PCT No.: PCT/US2017/051863
§ 371 (c)(1),
(2) Date: Dec. 31, 2018

(87) PCT Pub. No.: WO2018/053317
PCT Pub. Date: Mar. 22, 2018

(65) Prior Publication Data
US 2019/0193338 A1    Jun. 27, 2019

Related U.S. Application Data

(60) Provisional application No. 62/395,034, filed on Sep. 15, 2016.

(51) Int. Cl.
B32B 41/00    (2006.01)
B29C 65/82    (2006.01)
(Continued)

(52) U.S. Cl.
CPC .......... B29C 65/8207 (2013.01); B29C 65/02 (2013.01); B29C 65/82 (2013.01);
(Continued)

(58) Field of Classification Search
CPC ..... B29C 65/8207; B29C 65/82; B29C 65/02; B29C 66/1122; B29C 66/43;
(Continued)

(56) References Cited

U.S. PATENT DOCUMENTS 5,798,521 A    8/1998 Froggatt
5,841,034 A    11/1998 Ball
(Continued)

FOREIGN PATENT DOCUMENTS

WO    WO 2018/053317    3/2018

OTHER PUBLICATIONS

Kreager et al., "High Resolution Distributed Stain or Temperature Measurements in Single- and Multi-Mode Fiber Using Swept-Wavelength Interferometry," in Optical Fiber Sensors, OSA Technical Digest (CD) (Optical Society of America, 2006), paper ThE42 (4 pages).

(Continued)

Primary Examiner — Michael N Orlando
Assistant Examiner — Joshel Rivera
(74) Attorney, Agent, or Firm — Jenkins, Wilson, Taylor & Hunt, P.A.

(57) ABSTRACT

Joints, such as adhesive and welded thermoplastic joints, comprising embedded and/or surface mounted components of a sensor system are provided. The embedded and/or surface mounted component can be an optical fiber. Strain and/or stress can be monitored in the joint in a spatially resolved manner periodically or continuously, for example, to warn of potential failure of the joint or estimate residual/remaining life of a bonded component. The stress and/or (Continued)

strain information can also be used to improve the design of the joint. Methods and systems for monitoring stress and/or strain in a joint, and methods of preparing the joints are provided, as well.

26 Claims, 8 Drawing Sheets

(51) Int. Cl.
| | |
|---|---|
| *B29C 65/00* | (2006.01) |
| *F16B 11/00* | (2006.01) |
| *G01M 5/00* | (2006.01) |
| *G01M 11/08* | (2006.01) |
| *G01L 1/24* | (2006.01) |
| *B29C 65/02* | (2006.01) |
| *B29C 65/08* | (2006.01) |
| *B29C 65/14* | (2006.01) |
| *B29C 65/36* | (2006.01) |
| *B29C 65/48* | (2006.01) |

(52) U.S. Cl.
CPC .......... *B29C 66/1122* (2013.01); *B29C 66/43* (2013.01); *B29C 66/73921* (2013.01); *F16B 11/006* (2013.01); *G01L 1/242* (2013.01); *G01L 1/246* (2013.01); *G01M 5/0091* (2013.01); *G01M 11/081* (2013.01); *B29C 65/08* (2013.01); *B29C 65/14* (2013.01); *B29C 65/1412* (2013.01); *B29C 65/36* (2013.01); *B29C 65/48* (2013.01); *B29C 65/4835* (2013.01)

(58) Field of Classification Search
CPC ... B29C 66/73921; B29C 65/14; B29C 65/48; B29C 65/08; B29C 65/1412; B29C 65/36; B29C 65/4835; G01L 1/242; G01L 1/246; G01M 5/0091; G01M 11/081; F16B 11/006
USPC .................... 156/60, 64, 350, 351, 378, 379
See application file for complete search history.

(56) References Cited

U.S. PATENT DOCUMENTS

| | | |
|---|---|---|
| 6,545,760 B1 | 4/2003 | Froggatt et al. |
| 8,796,631 B2 | 8/2014 | Penumadu et al. |
| 9,411,058 B2 | 8/2016 | Penumadu |
| 2004/0099801 A1 | 5/2004 | Schulz |
| 2007/0237448 A1 | 10/2007 | Sato et al. |
| 2011/0247427 A1 | 10/2011 | Froggatt |
| 2012/0265449 A1 | 10/2012 | Ihn et al. |
| 2016/0024912 A1 | 1/2016 | Gajji et al. |
| 2016/0284449 A1* | 9/2016 | Haq .................... B29C 65/1425 |
| 2018/0118901 A1 | 5/2018 | Harper et al. |

OTHER PUBLICATIONS

Luna Inc., "Distributed Fiber Optic Stain Sensing: Applications in Composites Test and Measurement," Engineering Note EN-fV1317, Revision 3, Jul. 22, 2013 (7 pages).
Notification Concerning Transmittal of International Preliminary Report on Patentability (Chapter I of the Patent Cooperation Treaty) corresponding to PCT/US2017/051863, dated Mar. 28, 2019.
Notification of Transmittal of the International Search Report and the Written Opinion of the International Searching Authority, or the Declaration, corresponding to PCT/US2017/051863, dated Dec. 1, 2017.
Penumadu, "Smart Adhesive Joint for Composites and Metals," poster presented at The Composites and Advanced Materials Expo (CAMX) Meeting, Anaheim, California, Sep. 26-29, 2016.
Penumadu and Peebles, "Smart Adhesive Joints for Composites and Metals with on Demand Sensing for Structural Health," presented at TechNOV865, Knoxville, Tennessee, Sep. 18, 2017 (8 slides).

* cited by examiner

SMART JOINT FOR SIMILAR AND DISSIMILAR MATERIALS INCLUDING POLYMERS, FIBER REINFORCED COMPOSITES, METALS, CONCRETE, WOOD BASED PRODUCTS, AND OTHER STRUCTURAL MATERIALS

RELATED APPLICATIONS

This application is a national phase application of PCT International Patent Application PCT/US2017/051863, filed Sep. 15, 2017; which claims priority to and the benefit of U.S. Provisional Patent Application Ser. No. 62/395,034, filed Sep. 15, 2016; each of which is incorporated herein by reference in its entirety.

TECHNICAL FIELD

The subject matter disclosed herein relates generally to stress and/or strain sensing in joints formed between similar or dissimilar materials. More particularly, the subject matter disclosed herein can relate to joints such as adhesive joints or to thermally or electromagnetically welded thermoplastic joints comprising embedded and/or bonded sensor components that can provide stress and/or strain data, to systems that contain such a joint, to methods of preparing the joint, and to methods of measuring stress and/or strain in the joint.

BACKGROUND

The formation and integrity of structural joints between similar or dissimilar materials present a common challenge in many areas, including, but not limited to, the aerospace industry, the automotive industry, the manufacture of other vehicles (e.g., boats and trains), the energy industry (e.g., gas and/or oil extraction and/or distribution, wind and hydroelectric power generation, fuel pipelines, etc.), and in construction, as well as in building and maintaining infrastructure (e.g., roads, bridges, tunnels, sewers, water supplies, etc.) and various mechanical systems (e.g., heating and cooling systems). The integrity of structures used in these areas often depends upon the joints that are the least predictable because of potential variations in the surfaces being joined and/or in the approach used in joining them, such as with thermoset or thermoplastic adhesive based joints or fusion welded thermoplastic joints.

Accordingly, there is an ongoing need for methods and systems for use in determining improved joining protocols, as well as in predicting service lifetime, maximum load and/or other mechanical behavior for adhesive joints or other joints between similar and dissimilar materials. There is also an ongoing need for methods and systems to monitor, e.g., intermittently or continuously, the structural health of adhesive or other joints between similar and dissimilar materials, such as, for example, methods and systems that can measure stress and/or strain in adhesive or welded thermoplastic joints three-dimensionally.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides a joint comprising at least a first component and a second component, wherein a surface of the first component and a surface of the second component are attached to one another at a joint, wherein said joint is selected from an adhesive joint or a welded thermoplastic joint, further wherein said joint is configured to provide stress and/or strain values at one or more locations in the joint, wherein said stress and/or strain values can be provided periodically or continuously, optionally wherein said stress and/or strain values can be determined in three dimensions. In some embodiments, the joint comprises a length of optical fiber embedded in the joint and/or attached to a surface of the joint, optionally such as a surface of one or more of the components joined by the joint or a surface of an adhesive layer of an adhesive joint, optionally wherein the length of optical fiber traverses at least a portion of a length or a width of the joint and/or is positioned to traverse an angle between a length or a width of the joint, further optionally wherein the length of the optical fiber forms at least one configuration, such as but not limited to at least one "Z"-shaped configuration, and/or wherein the optical fiber has an outer diameter of about 0.2 millimeters (mm) or less.

In some embodiments, the joint is an adhesive joint, wherein a surface of the first component and a surface of the second component are attached to one another at a joint via an adhesive layer. In some embodiments, the adhesive joint comprises a length of optical fiber embedded in or attached to the adhesive layer and/or attached to a surface of one or more component joined by the joint, optionally wherein the length of optical fiber traverses at least a portion of a length or a width of the adhesive layer and/or is positioned to traverse an angle between a length or a width of the adhesive layer, further optionally wherein the length of the optical fiber forms at least one configuration, such as but not limited to at least one "Z"-shaped configuration, and/or wherein the optical fiber has an outer diameter of about 0.2 millimeters (mm) or less. In some embodiments, the adhesive layer comprises a thermosetting adhesive, optionally a thermosetting methacrylate.

In some embodiments, the first component comprises a same or a different material than the second component, optionally wherein the material of the first component and the material of the second component are each independently selected from the group comprising a metal, concrete, stone, bone, a ceramic, a carbon fiber composite, a glass or glass composite, wood or wood based product, a thermoplastic or thermosetting polymer, and mixtures thereof. In some embodiments, at least one of the first component and the second component comprises a metal, optionally aluminum, or a carbon fiber composite.

In some embodiments, the presently disclosed subject matter provides a method of preparing a joint of the presently disclosed subject matter. In some embodiments, the method comprises: (a) providing a first component, a second component, and a layer of uncured adhesive positioned between a surface of the first component and a surface of the second component; and (b) incorporating a sensing component of a sensing system, wherein the incorporating comprises: (i) inserting the sensing component into the layer of adhesive during the curing of the adhesive, (ii) curing the adhesive and inserting the sensing component into the cured adhesive, and/or (iii) curing the adhesive and attaching the sensing component to a surface of the adhesive joint, optionally a surface of the adhesive layer, a surface of the first component, and/or a surface of the second component. In some embodiments, the sensing component comprises a length of optical fiber, optionally a length of fiber optic cable, further optionally wherein the optical fiber is configured in at least one configuration, such as but not limited to a "Z" configuration.

In some embodiments, the presently disclosed subject matter provides a method of preparing a joint of the presently disclosed subject matter. In some embodiments, the method comprises: (a) providing a first component and a second component, wherein the first and second components each comprise a thermoplastic material; and (b) incorporating a sensing component of a sensing system, wherein the incorporating comprises: (i) configuring the sensing component between the first and second component and forming a welded thermoplastic joint between the first and second components, optionally via thermal or electromagnetic welding, (ii) forming a welded thermoplastic joint between the first and second components, optionally via thermal or electromagnetic welding, and inserting the sensing component into the joint, and/or (iii) forming a welded thermoplastic joint between the first and second components, optionally via thermal or electromagnetic welding, and attaching the sensing component to a surface of the welded joint. In some embodiments, the sensing component comprises a length of optical fiber, optionally a length of fiber optic cable, further optionally wherein the optical fiber is configured in at least one configuration, such as but not limited to a "Z" configuration.

In some embodiments, the presently disclosed subject matter provides a method of measuring stress and/or strain in a joint, the method comprising: (a) providing a joint, such as an adhesive or welded thermoplastic joint, wherein the joint is configured to provide stress and/or strain values at one or more locations in the joint; (b) directing a signal into a sensing component embedded in the joint and/or attached to a surface of the joint, optionally a surface of one or more components joined by the joint; (c) detecting a signal emitted from the sensing component; and (d) processing the signal from (c) to determine stress and/or strain information at one or more points in the joint. In some embodiments, step (b) comprises directing an optical signal into the sensing component, wherein the sensing component comprises a length of optical fiber, optionally wherein the optical fiber is embedded in a layer of adhesive of an adhesive joint; and wherein step (c) comprises detecting the optical signal after it is guided through at least a portion of the length of the optical fiber.

In some embodiments, the method is used to measure stress and/or strain intermittently or continuously over a period of time and/or wherein the method is used to measure stress and/or strain in three dimensions. In some embodiments, the method further comprises performing digital image correlation (DIC), optionally three-dimensional (3D) DIC.

In some embodiments, the method further comprises subjecting a predetermined force or condition on the joint of step (a), optionally wherein the predetermined force of condition is selected from a stress, a load, a temperature, and a temperature gradient. In some embodiments, the method further comprises determining the maximum load that can be exerted on the joint.

In some embodiments, the presently disclosed subject matter provides a system for monitoring stress and/or strain in a joint comprising: (a) a joint comprising at least a first component and a second component, wherein a surface of the first component and a surface of the second component are attached to one another at a joint, wherein said joint is selected from an adhesive joint or a welded thermoplastic joint; and (b) a sensor system comprising: (i) a sensing component, optionally wherein the sensing component comprises a length of optical fiber embedded in the joint and/or attached to a surface of the joint, optionally a surface of one or more components joined by the joint, optionally wherein the length of optical fiber traverses at least a portion of a width and/or a length of the joint and/or forms an angle between a width and/or a length of the joint, further optionally wherein the length of the optical fiber forms at least one configuration, such as but not limited to at least one "Z"-shaped configuration; (ii) an signal source module arranged to emit a signal into the sensing component, optionally wherein the signal source module emits an optical signal, further optionally wherein the signal source comprises a light emitting diode (LED) or a laser; and (iii) a signal detection module arranged to detect signal emitted from the sensing component, optionally wherein the signal detection module is arranged to detect an optical signal guided from the signal source module by at least a portion of the sensing component.

In some embodiments, the sensor system further comprises a signal processing module, wherein the signal processing module is in communication with the signal detection module; and optionally comprising an operator interface in communication with the signal processing module and/or a data visualization module in communication with the signal processing module, wherein the data visualization module is programmed to display stress and/or strain measurement data. In some embodiments, the sensing component comprises a length of optical fiber and an end of the length of optical fiber comprises a connector for detachably connecting the optical fiber to the signal source module and the signal detection module.

In some embodiments, the system further comprises one or more cameras, optionally two cameras, positioned to record an image, optionally a digital image, of the joint. In some embodiments, the system further comprises a module to subject one or more locations of the joint to a predetermined force or condition, optionally wherein the predetermined force or condition is selected from a stress, load, temperature, and a temperature gradient.

It is an object of the presently disclosed subject matter to provide joints (e.g., adhesive or welded thermoplastic joints) configured to provide stress and/or strain values at one or more locations in the joint, methods of preparing such joints, and to methods and systems for monitoring stress and/or strain in the joints. An object of the presently disclosed subject matter having been stated hereinabove, and which is achieved in whole or in part by the presently disclosed subject matter, other objects will become evident as the description proceeds when taken in connection with the accompanying drawings and examples as best described herein below.

DETAILED DESCRIPTION

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "an optical fiber" includes a plurality or mixture of fibers, and so forth.

Unless otherwise indicated, all numbers expressing quantities of size (e.g., length, width, thickness), force, strain, stress, temperature or other conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount of size, weight, concentration, temperature, percentage, or the like is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units. A "copolymer" refers to a polymer derived from more than one species of monomer.

The term "adhesive" as used herein refers to a substance that can bind two components (i.e., two structural components, two non-structural components, or a combination of a structural and a non-structural component) together. The adhesive can be applied to a surface of one of the components or to a surface of both of the components. The components can be of the same or dissimilar materials.

The term "thermoplastic" can refer to a polymer that softens and/or can be molded above a certain temperature, but is solid below that temperature. In some embodiments, the thermoplastic can be a thermoplastic adhesive. The thermoplastic adhesive can be a hot-melt adhesive. Thermoplastic adhesives include, but are not limited to, ethylene vinyl acetate (EVA), polyolefins, polyamides, polyesters, styrene block copolymers (SBCs), polycarbonates, silicone rubbers, fluoropolymers, thermoplastic elastomers, polypyrrole, polycaprolactone, and mixtures and/or combinations thereof.

The terms "thermoset adhesive" and "thermosetting adhesive" refer to a polymer that is irreversibly formed when polymer precursors (e.g., monomers and/or oligomers) react with one another when exposed to heat, suitable radiation (e.g., visible or ultraviolet light), and/or suitable chemical conditions (e.g., the addition of a chemical polymerization initiator or catalyst (e.g. a peroxide) and/or exposure to suitable pH conditions (such as brought about by the addition of an acid or base)). In some embodiments, the thermoset adhesive comprises a crosslinked polymer. Thermoset adhesives include, but are not limited to, epoxy adhesives, polyurethane adhesives cyanoacrylate adhesives, acrylic polymers (e.g., methacrylates) and mixtures and/or combinations thereof.

The terms "cure", "curing", and "cured" as used herein can refers to the hardening of a thermoplastic adhesive or to the formation of a solid thermoset polymer from its precursors. In some embodiments, the "curing" and its variations refers to the curing of a thermoset adhesive.

The term "joint" as used herein refers to a location where at least two components (i.e., at least two parts) of a structure, such as a man-made machine, tool, building, vehicle or other man-made object, are joined together. In some embodiments, the components can be joined together in a particular geometry. In some embodiments, the joint is a butt, corner, edge, lap or tee joint. The at least two components can comprise the same or different materials, such as, but not limited to metal, concrete, stone, wood, plastic, carbon-fiber composite, glass, and glass composite. In some embodiments, the joint is an adhesive joint, wherein the at least two components are joined together via an adhesive layer (e.g., a thermoplastic or thermosetting adhesive layer). In some embodiments, the joint is a welded joint, e.g., joined together via solder or via a fusion welding technique. In some embodiments, the welded joint is a welded thermoplastic joint, wherein at least two components comprising a thermoplastic polymer material are joined together thermally or electromagnetically. For example, in some embodiments, a welded thermoplastic joint can be formed by fusion welding, e.g., localized heating (e.g., using laser, infrared or other radiation, ultrasonic waves, induction heating, etc.) of at least two thermoplastic components, thereby causing surfaces of the at least two components to soften such that polymer chains of the at least two components interdiffuse. When cooled the interdiffused polymer chains can form a solid bond at the interface of the components.

II. General Conditions

The presently disclosed subject matter provides, in some embodiments, a joint configured to provide stress and/or strain values at one or more locations in the joint in one or more directions. Thus, in some embodiments, the joint is configured to provide spatially resolved strain and/or stress data in real time. The joint can be configured to provide data periodically or continuously, and/or to provide three-dimensional data. The data can measure strain experienced in the joint to help determine the mechanical integrity of the joint, along with the ability to predict stress levels at which the joint will undergo large deformation, providing an alert to potential failure under manufacturing and/or use conditions.

The joint can comprise at least a first component and a second component, which can be independently selected from any suitable material. In some embodiments, the first and the second components are independently selected from metal (e.g., aluminum or steel), concrete, stone, bone, ceramic, a carbon fiber or other fiber composite, a glass or glass composite, wood or a wood based material (e.g., particle board), a polymer (e.g., a thermoplastic or thermosetting polymer) and mixtures thereof. Thus, in some embodiments, the first and the second components are of the same material. In some embodiments, the first and the second components are of different materials. In some embodiments, at least one of the first component and the second component comprises a metal. In some embodiments, at least one of the first component and the second component comprises aluminum. In some embodiments, at least one of the first and second components comprises a carbon fiber composite. In some embodiments, at least one of the first and second components comprises a thermoplastic polymer.

In some embodiments, the joint is an adhesive joint. Thus, in some embodiments, a surface of the first component and a surface of the second component can be joined together by a layer of adhesive (e.g., a thermosetting or a thermoplastic adhesive). In some embodiments, the adhesive layer comprises a thermosetting adhesive. In some embodiments, the adhesive layer comprises a thermosetting methacrylate.

In some embodiments, the joint is a welded thermoplastic joint. In some embodiments, the welded thermoplastic joint is a thermally welded thermoplastic joint. Thus, in some embodiments, a surface of the first component and a surface of the second component are joined together by a layer of cooled thermoplastic polymer, e.g., formed by the interdiffusion of polymer chains from the first and second components.

In some embodiments, the surfaces being joined comprise only a small portion (e.g., less then about 40, 30, 20, or 10%) of the overall surface of one or more of the components. In some embodiments, a sensing component is embedded within the joint, e.g., in a layer of adhesive of an adhesive joint (either while the adhesive joint is being prepared or after the adhesive joint is prepared). Alternatively or additionally, in some embodiments, a sensing component is bonded (e.g., with an adhesive) or otherwise attached to a surface of the adhesive joint, such as to a surface of the first and/or the second component. Thus, for example, in some embodiments, the sensing component can be attached to an existing joint (e.g., a pipe, a welded connection, or a bolted connection) using a tape or a thin thermoplastic or thermoset polymer based film.

In some embodiments, the sensing component comprises an optical fiber. In some embodiments, more than one optical fiber can be used. In some embodiments, the sensing component can be a fiber optic cable, which can include one or more optical fibers contained in a single protective tube (e.g., a flexible plastic tube). In some embodiments, the optical fiber or fiber optic cable can have a outer diameter of about 0.2 millimeters (mm) or less (e.g., about 0.20 mm, about 0.15 mm, about 0.10, about 0.05 mm, or about 0.01 mm or less). Suitable fiber optic cables are commercially available, e.g., from Luna Inc. (Blacksburg, Va., United States of America).

The sensing component can be configured within or one a joint (e.g., in the adhesive layer or an adhesive joint and/or on a surface of the adhesive joint or in between two components jointed by a welded thermoplastic joint and/or an a surface of the welded thermoplastic joint), such as on the surface of one or more of the components being joined, in any suitable shape. In some embodiments, at least a length of an optical fiber or fiber optic cable can be configured to traverse a length and/or a width (or a portion thereof) of the joint. In some embodiments, the optical fiber or fiber optic cable can be configured at least partially at an angle to the length and width of the joint. In some embodiments, the optical fiber or fiber optic cable can be configured in one or more "W"-, "Z"-, or "S"-shape (e.g., configured in the shape of one or more letters W, Z, or S). In some embodiments, configuration or layout choice can be tailored to provide a measure of one or more axial and/or one or more shear component of stress and/or strain. In some embodiments, the configuration choice can be tailored to provide measurements of at least 6 independent components (e.g., 3 shear and 3 axial) of stress and/or strain. Thus, in some embodiments, the presently disclosed subject matter provides a "smart" joint (e.g., a "smart" adhesive joint) configured to interpret strain tensor from multiple strain readings along a continuous fiber optic cable integrated while the joint is made or after the joint is made, where layout choice of the optical fiber can provide data for multiple shear and axial components.

The presently disclosed subject matter can be used to predict failure in a joint and provide response to working stress for optimizing design of the joint (e.g., the configuration of the joint, the choice and/or amount of adhesive or an adhesive joint, a surface treatment of components being joined, etc.). Since the optical fiber embedded in or attached to the surface of a joint can be left in the structure, the health of the joint throughout the structure's lifetime, e.g., by accessing a connector at an end of the optical fiber.

In some embodiments, the presently disclosed subject matter provides a method of preparing a joint configured to provide stress and/or strain values. In some embodiments, the joint is an adhesive joint or a welded thermoplastic joint. The method can comprise providing at least a first component and a component and a sensing component. The first and second components can be joined together and then the sensing component can be inserted into the joint or attached to a surface of the joint in a particular configuration. Additionally or alternatively, the sensing components can be configured between the first and second components prior to formation of the joint and thus be present embedded in the joint after the joint is formed (e.g., by the curing of an adhesive layer or the fusion of the first and second components).

In some embodiments, the presently disclosed subject matter provides a method of preparing an adhesive joint configured to provide stress and/or strain values. The method can comprise providing a first component, a second component and a layer of uncured adhesive between a surface of the first component and a surface of the second component, and incorporating a sensing component (e.g., a length of optical fiber or fiber optic cable). In some embodiments, the sensing component can be inserted into the layer of uncured adhesive prior to, or during, curing of the adhesive. In some embodiments, the layer of adhesive can be cured and then the sensing component can be inserted into the cured adhesive layer (e.g., into an opening drilled into the adhesive layer). In some embodiments, the sensing component can be attached (e.g., using tape or a thin thermosetting or thermoplastic polymer based film) to a surface of the adhesive joint, e.g., after the adhesive is cured (e.g., to a surface of the adhesive layer and/or to a surface of the first and/or second components at or near the joint). In some embodiments, a combination of inserting and/or attaching can be performed.

In some embodiments, the presently disclosed subject matter provides a method of preparing a joint (e.g., a welded thermoplastic joint) configured to provide stress and/or strain values. The method can comprise, providing a first component and a second component, wherein the first and second components each comprise a thermoplastic material; and incorporating a sensing component of a sensing system. In some embodiments, the sensing component can be configured between the first and second component and then a welded thermoplastic joint can be formed between the first and second components, e.g., via thermal or electromagnetic welding. In some embodiments, a welded thermoplastic joint can be formed between the first and second components, e.g., via thermal or electromagnetic welding, and the sensing component can be inserted into the joint. In some embodiments, a welded thermoplastic joint can be formed between the first and second components, e.g., via thermal or electromagnetic welding, and the sensing component can be attached to a surface of the welded joint (e.g., to surface of the first and/or second components at and/or near the joint), such as by using tape or a thin thermosetting or thermoplastic polymer based film. In some embodiments, a combination of inserting and/or attaching can be performed. In some embodiments, the sensing component comprises a length of optical fiber, optionally a length of fiber optic cable, further optionally wherein the optical fiber is configured in at least one configuration, such as but not limited to a "Z" configuration.

Figure 2A:
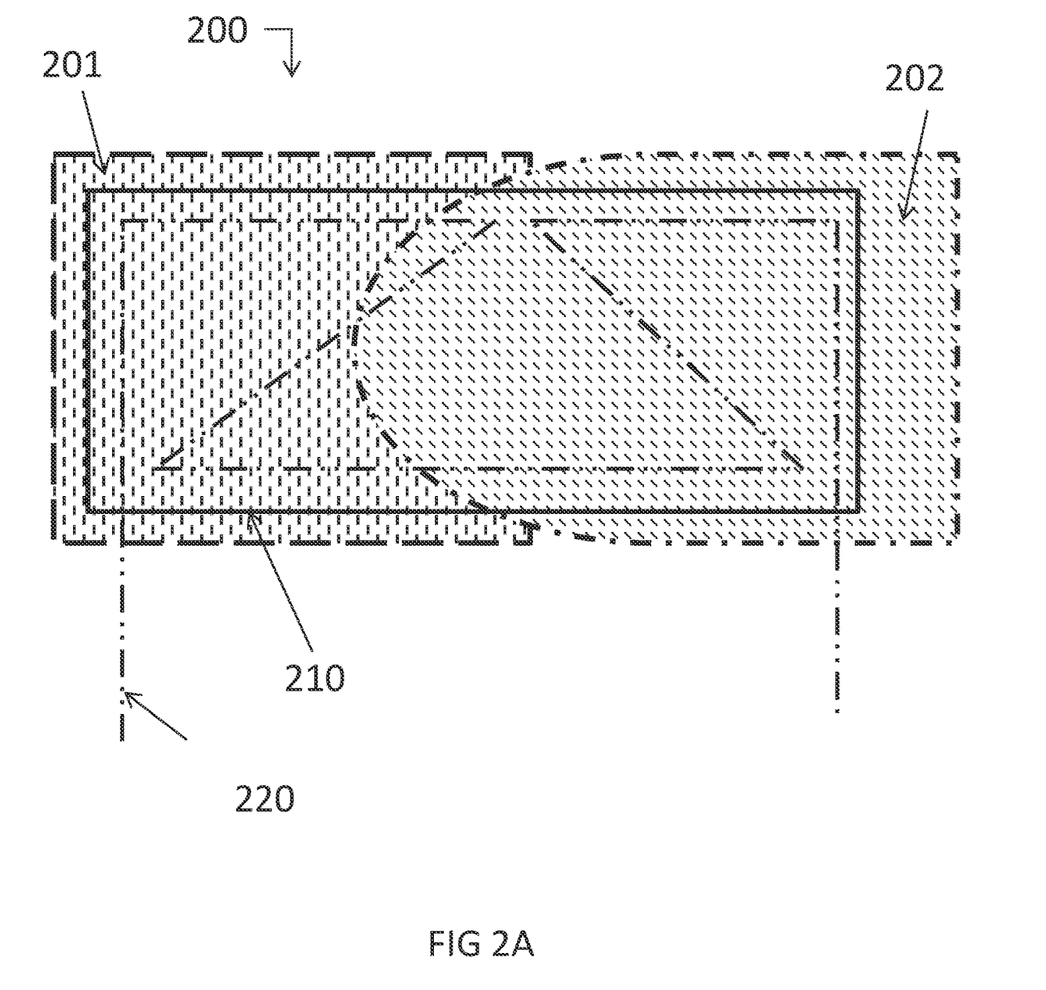
FIG. 2A is a schematic drawing of an exemplary adhesive joint of the presently disclosed subject matter showing an optical fiber embedded in the adhesive layer in a series of "Z" configurations.

FIG. 2A shows exemplary adhesive joint 200 of the presently disclosed subject matter. As shown in FIG. 2A, adhesive joint 200 comprises two components, 201 and 202. One end of first component 201 overlaps with one end of second component 202. The overlapping ends are held together by adhesive coating layer 210, which, in FIG. 2A is configured as a rectangular layer having a length sufficient to cover the overlapping ends of components 201 and 202 and having a width that is slightly less than that of components 201 and 202. Optical fiber 220 is embedded within an adhesive coating layer 210 and is configured in a pair of mirror image, connecting "Z" shapes, such that portions of optical fiber 220 are positioned on ends of components 201 and 202 near their overlap, as well as over the overlapping portions of components 201 and 202. Optical fiber 220 is also configured such that it substantially spans the length and width of adhesive layer 210.

Figure 2B:
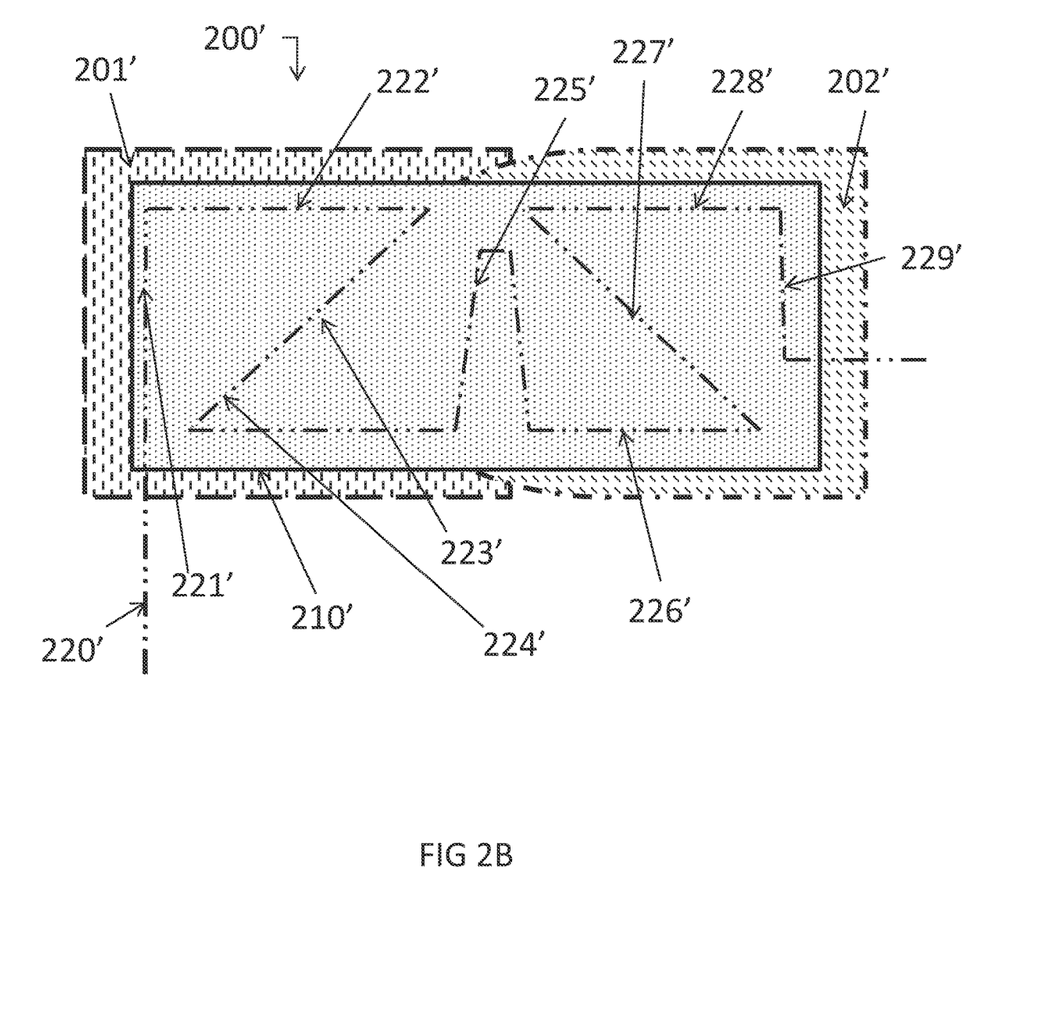
FIG. 2B is a schematic drawing of an exemplary adhesive joint of the presently disclosed subject matter showing an optical fiber attached to the surface of the adhesive layer.

FIG. 2B shows exemplary adhesive joint 200' of the presently disclosed subject matter. As shown in FIG. 2B, adhesive joint 200' comprises two components, 201' and 202'. One end of first component 201' overlaps with one end of second component 202'. The overlapping ends are held together by adhesive coating layer 210', which, in FIG. 2B is configured as a rectangular layer having a length sufficient to cover the overlapping ends of components 201' and 202' and having a width that is slightly less than that of components 201' and 202'. Optical fiber 220' is attached to the surface of adhesive coating layer 210' and is configured such that portions of optical fiber 220' are positioned over ends of components 201' and 202' near their overlap, as well as over the overlapping portions of components 201' and 202'. Optical fiber 220' is also configured such that it substantially spans the length and width of adhesive layer 210'. Stress and/or strain at various locations along optical fiber 220' can be individually assessed to provide information about stress and/or strain at particular locations within the joint, e.g., providing information about which joint location or locations are most likely to fail. For example, stress and/or strain can be individually measured at locations 221', 222', 223', 224', 225', 226', 227', 228', and 229' along optical fiber 220'.

In some embodiments, the presently disclosed subject matter provides a method of measuring stress and/or strain in a joint (e.g., an adhesive joint), where the method comprises: (a) providing a joint; (b) directing a signal into a sensing component (e.g., a length of optical fiber or fiber optic cable); (c) detecting a signal emitted from the sensing component; and (d) processing the signal emitted from the sensing component to determine stress and/or strain information at one or more points in the joint. In some embodiments, the sensing component is a length of optical fiber or fiber optic cable and step (b) comprises directing an optical signal into the optical fiber or fiber optic cable and step (c) comprises detecting the optical signal after it is guided through at least a portion of the length of the optical fiber or fiber optic cable. Methods of processing optical signals from fiber optics to determine stress and/or strain are known in the art (e.g., based on Rayleigh scatter). In some embodiments, the joint is an adhesive or welded thermoplastic joint and the sensing component (e.g., the length of optical fiber of fiber optic cable) embedded in the adhesive layer of and adhesive joint and/or attached to a surface of an adhesive layer or one or more components joined by an adhesive joint or is embedded in a welded thermoplastic joint and/or attached to a surface of a component joined by a welded thermoplastic joint.

Traditional fiber optic sensing techniques can employ the use of Fiber Bragg Grating (FBG) to measure a single or series of discrete point sensors placed along the length of an optical fiber. Optical fibers offer the advantage of multiple points of measurement instead of a single point, which can lead to entire part monitoring or mapping. High Definition Fiber Optic Sensing (HD-FOS) avoids the need to etch individual gratings into a fiber, enabling a truly distributed measurement continuously along the optical fiber. This can allow the sensor to be manufactured from relatively inexpensive telecommunications grade optical fiber composed, for example, from a germanium-doped fused silica core, a fused silica cladding, and an outer polyamide coating for increased strength. Thus, fiber optic sensors can be lightweight, flexible and minimally invasive. Other properties of optical fibers include immunity to RF/EMI and good fatigue lifetime. Optical fiber sensors can be up to tens of meters long with sensing points approximately every 1 millimeter along the entire cable.

In some cases, strain measurements with fiber optic sensors can be achieved without the use of gratings by measuring the low amplitude signal of reflected light referred to as Rayleigh backscatter. These small amplitude reflections are a result of refractive index fluctuations in optical fiber formed during the fiber's manufacturing process. The Rayleigh backscatter is a random but static signal, making the scatter pattern unique for every individual fiber. This scatter "fingerprint" can be used to measure a shift in the fiber between a reference state and an externally stimulated state. This shift can be calibrated to strain, resulting in strain measurements continuously along the entire length of an optical fiber or fiber optic cable, with high spatial density. See Kreager et al., in *Optical Fiber Sensors*, OSA Technical Digest (CD) (Optical Society of America, 2006), paper ThE42.

In some embodiments, one or more cameras can be used to record images (e.g., digital images) of the joint (e.g., the adhesive joint), as well. Thus, in some embodiments, the stress and/or strain measurements provided based on the data obtained from the signal detected from the sensing component can be compared or used in conjunction with contour, deformation, vibration and/or strain data collected using digital image correlation (DIC), e.g., three-dimensional digital image correlation (3D DIC).

In some embodiments, the joint (e.g., the adhesive joint) can be subjected to a predetermined force or condition (e.g., a stress, a load, temperature, etc.) prior to step (b). In some embodiments, the joint can be subjected sequentially to multiple predetermined forces and the stress and/or strain can be measured upon application of each individual force or condition. Thus, in some embodiments, the joint can be subjected to tensile loading in a controlled fashion and precise amplitudes of strain at various locations and orientations can be determined. In some embodiments, strain and thus stresses experienced at various locations in the joint can be provided using real-time data on mechanical integrity and/or provide for prediction of stress levels at which the joint will undergo plastic deformation of failure. In some embodiments, the method can be used to determine the maximum load that can be exerted on the joint. The method can be used to help improve the design of the joint. The method can be used to continuously or periodically monitor the state of health of a joint, e.g., a joint between two metal components or a hybrid joint (i.e., a joint between two dissimilar materials, such as a metal and a carbon fiber composite). Thus, the presently disclosed subject matter can be used to monitor the health of joints in structures such as buildings (e.g., houses, office buildings, sports stadiums, etc), bridges, and the like; in vehicles, such automobiles, planes, boats, ships, etc., and in other objects.

For example, the presently disclosed "smart" joints can be used to monitor, optimize, and/or evaluate joints (e.g., adhesively bonded joints) for automotive applications. One such application can involve the joining of structural and non-structural shells of automobiles manufactured using sheet molding compounds (SMCs) or similar short and continuous fiber composites for structural parts (e.g., interior structural parts) bonded to exterior Class-A surface parts made from lower strength and modulus SMCs or sheet metals. A "Class A surface" refers to a glossy and/or shiny surface of automobile doors or hoods that can be seen from the outside of the automobile. They typically get attached to inside, structurally strong shells or frames using adhesives. During the painting process to get the Class A surface, bonded parts generally are exposed to severe heat (e.g., typically between about 180 and about 215° F.) in a paint room. During this time, the joints can soften or deform, causing failures or problems.

The avoidance of riveting in adhesively joined surfaces can be useful in enhancing stealth characteristics, which can be especially of interest in aerospace and/or naval applications. Thus, the present "smart" joints can also be useful determining the strength of joints in airplanes and ships, to monitor the health of these joints, and/or to provide a measure of the remaining service life in such joints, e.g., after a given number of missions (e.g., flights or voyages).

Plasma based surface treatments are becoming more popular to try to improve the strength of adhesive joints. In some embodiments, the use of the presently disclosed "smart" joints can be useful in evaluating the effectiveness of plasma treatments on surfaces being joined and/or for optimizing such treatments. Thus, in some embodiments, the presently disclosed subject matter can be used in a method of optimizing a surface preparation for a component being joined.

In addition, thermoplastic joining is beginning to be considered for larger structures, such as wind blades, where it is likely that joining of thick and/or otherwise large sections will be joined with fusion welding techniques. In addition, thermoset based wind blades made from glass fiber composites are typically made in two halves and then joined along their entire length. In some cases, 50 to 100 meter blades are being made with an adhesive joint. The presently disclosed "smart" joints can also be used to measure the strength of these types of joints.

In some embodiments, the presently disclosed subject matter provides a system for monitoring stress and/or strain in a joint comprising: (a) a joint comprising at least a first component and a second component, wherein a surface of the first component and a surface of the second component are attached to one at a joint, wherein said joint is selected from an adhesive joint or a welded thermoplastic joint; and (b) a sensor system comprising: (i) a sensing component; (ii) an signal source module arranged to emit a signal into the sensing component; and (iii) a signal detection module arranged to detect signal emitted from the sensing component, optionally wherein the signal detection module is arranged to detect an optical signal guided from the signal source module by at least a portion of the sensing component. In some embodiments, the joint is an adhesive joint or a welded thermoplastic joint. In some embodiments, the sensing component comprises a length of optical fiber embedded in the joint and/or attached to a surface of the joint, such as a surface of one or more components joined by the joint. In some embodiments, the length of optical fiber traverses at least a portion of a width and/or a length of the joint and/or forms an angle between a width and/or a length of the joint. In some embodiments, the length of the optical fiber forms at least one configuration, such as but not limited to at least one "Z", "W"-, "S"-shaped or other configuration to provide stress and/or strain data from multiple components, i.e., axial and sheer. The sensing component can comprise a length of optical fiber or fiber optic cable that can comprise a connector that can be detachably connected to the signal source module and the signal detection module, so that the stress and/or strain can be measured when desired.

In some embodiments, the presently disclosed subject matter provides a system for measuring stress and/or strain in an adhesive joint. The systems can comprise: (a) an adhesive joint comprising at least a first component and a second component, wherein a surface of the first component and a surface of the second component are attached to one another via a layer of adhesive; and (b) a sensor system comprising: (i) a sensing component, (ii) an signal source module arranged to emit a signal into the sensing component, and (iii) a signal detection module arranged to detect signal emitted from the sensing component. In some embodiments, the sensing component can comprise a length of optical fiber or fiber optic cable. In some embodiments, the length of optical fiber of fiber optic cable can be configured, at least partially, to traverse, in whole or in part, a width or length of the layer of adhesive layer. In some embodiments, the length of optical fiber or fiber optic cable can be configured, at least partially, at an angle to the width and length of the layer of adhesive. In some embodiments, the length of optical fiber or fiber optic cable can be configured in one or more "W"-, "Z"-, "S"-shape or other configurations to provide stress and/or strain data from multiple components, i.e., axial and shear. The sensing component can comprise a length of optical fiber or fiber optic cable that can comprise a connector that can be detachably connected to the signal source module and the signal detection module, so that the stress and/or strain can be measured when desired. In some embodiments, the sensing component is embedded in the layer of adhesive. Alternatively or additionally, in some embodiments, the sensing component is bonded or otherwise attached to a surface of the adhesive joint, such as to a surface of one or both of the first and second components, e.g., over and/or near the adhesive joint.

In some embodiments, the signal source emits an optical signal. In some embodiments, the signal source comprises a light emitting diode (LED) or a laser. In some embodiments, the signal detection module is arranged to detect an optical signal guided from the signal source module by at least a portion of the sensing component. In some embodiments, the signal detection module can comprise a photodetector or other optical-electrical converter. In some embodiments, the signal source module and the signal detection module can be contained in a single housing unit and/or use common circuitry.

The system can also include one or more optional items. For example, in some embodiments, the sensor system can further comprise a signal processing module, wherein the signal processing module is in communication with the signal detection module. Typically, the signal processing module can include an electronic processor, such as a computer. In some embodiments, the system can comprise an operator interface in communication with the signal processing module and/or a data visualization module in communication with the signal processing module, wherein the data visualization module is programmed to display stress and/or strain measurement data.

In some embodiments, the system can include a module that can subject one or more locations (e.g., surfaces) of the adhesive joint to a force or condition (e.g., a stress, load, temperature or temperature gradient). For instance, the system can include a commercially available tensile testing system.

In some embodiments, the system can include one or more cameras to take and record an optical image or series of optical images of the adhesive joint, e.g., when subjected to a predetermined force or condition. In some embodiments, the one or more cameras can be digital cameras. In some embodiments, the system can include two digital cameras.

Figure 3A:
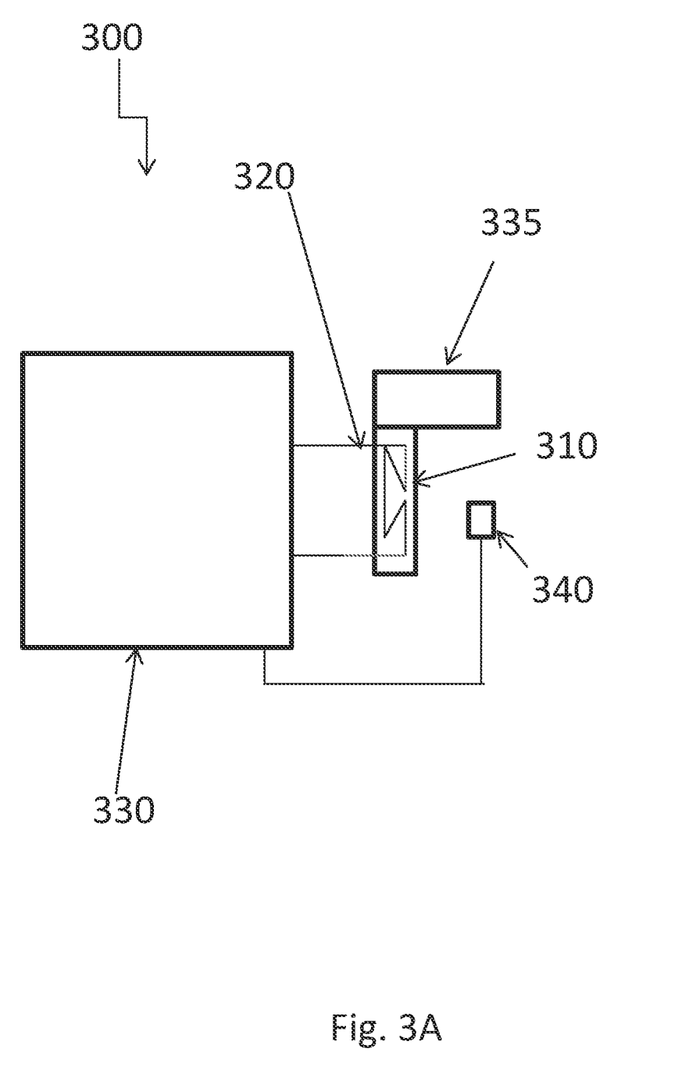
FIG. 3A is a schematic drawing of an exemplary system for monitoring stress and/or strain in an adhesive joint.

FIG. 3A shows a schematic drawing of exemplary system 300 of the presently disclosed subject matter containing adhesive joint 310, which comprises optical fiber 320 embedded in the adhesive layer and/or attached on a surface or surfaces of the adhesive joint, such as on a surface or surfaces of components joined by the adhesive joint in a series of "Z" configurations. Optical fiber 320 is also in communication with combined signal source module/signal detection module 330, which is in communication with optional camera 340 (e.g., a digital camera) positioned to record optical images of the adhesive joint when force application module 335 subjects adhesive joint 310 to a force. In some embodiments, such as shown in FIG. 3A, camera 340 can be connected to signal source module/signal detection module 330. Optionally, combined signal source module/signal detection module 330 can include one or more of a signal processing module, an operator interface, and/or a data visualization module. Alternatively, combined signal source module/signal detection module 330 can be connected to a separate computer and/or microprocessor that is configured to process signal and/or control signal input and/or visualize data. Force application module 335 (e.g., a commercial tensile testing system) can be optionally connected to signal source module/signal detection module 330 or be controlled separately.

Figure 3B:
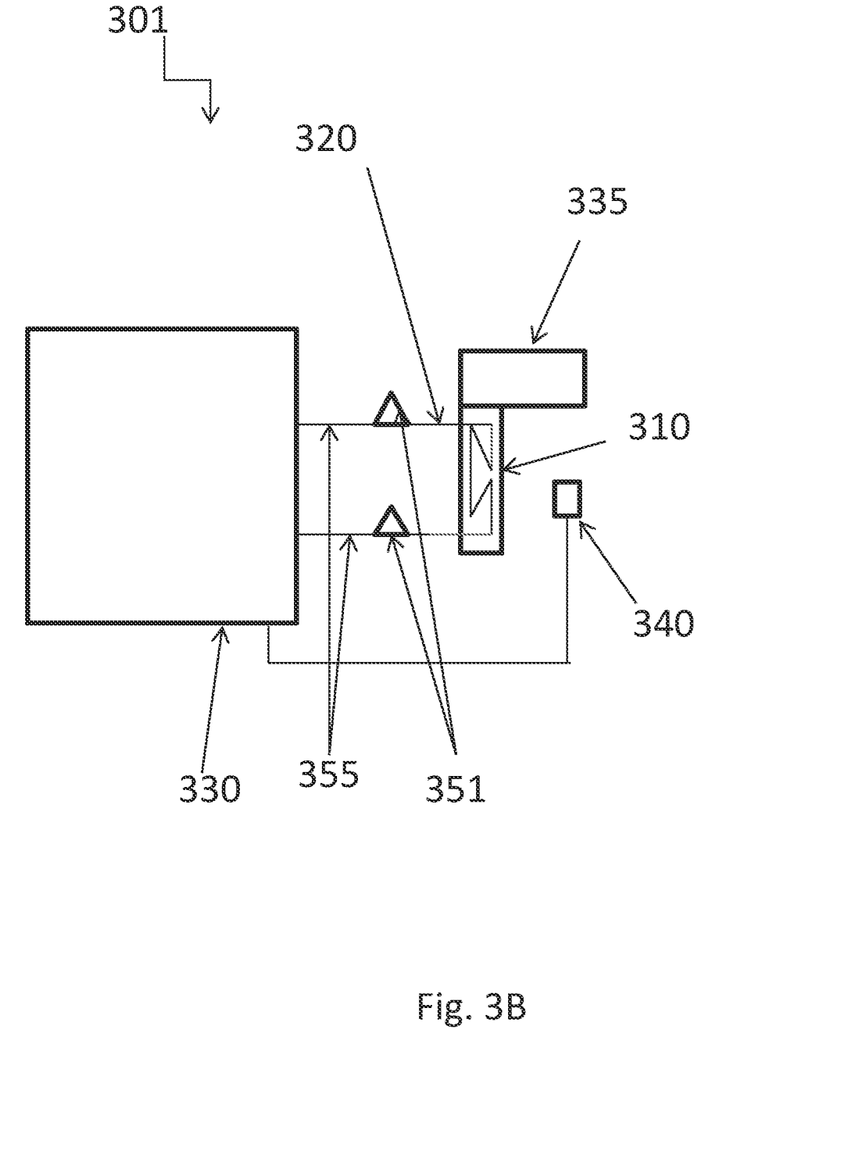
FIG. 3B is a schematic drawing of an exemplary system for monitoring stress and/or strain in an adhesive joint wherein the adhesive joint comprises a sensing component that is detachably connected to a signal source module/signal detection module.

FIG. 3B shows an alternative exemplary system 301. As in system 300 of FIG. 3A, system 301 includes adhesive joint 310, optical fiber 320, signal source module/signal detection module 330, force application module 335, and camera 340. System 301 also includes connectors 351, which can detachable connect ends of optical fiber 320 to signal source module/signal detection module 330, directly or via additional lengths 355 of optical fiber as shown in FIG. 3B. Thus, in some embodiments, components of a system can be brought to a joint comprising a sensing component, such as an optical fiber, and connected to the sensing component when testing is to be carried out. When testing is not being carried out, the sensing component can be detached from other components and the other components can be attached to the sensing component of another joint and be used to test another joint, if desired.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Metal-Metal "Smart" Joint

Figure 1A:
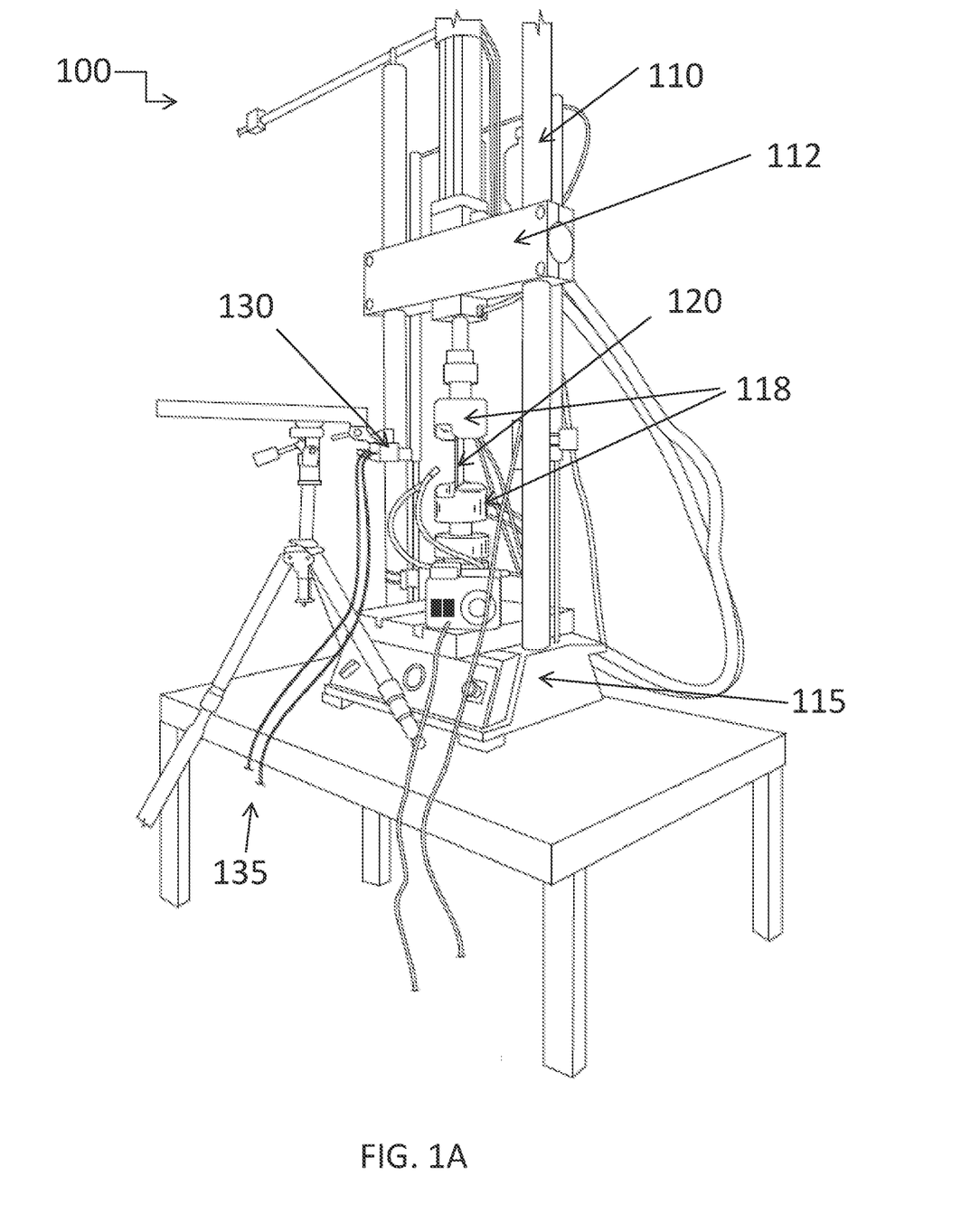
FIG. 1A is a perspective view of an exemplary adhesive joint of the presently disclosed subject matter being subjected to a tensile test in a table top tensile testing system.
Figure 1B:
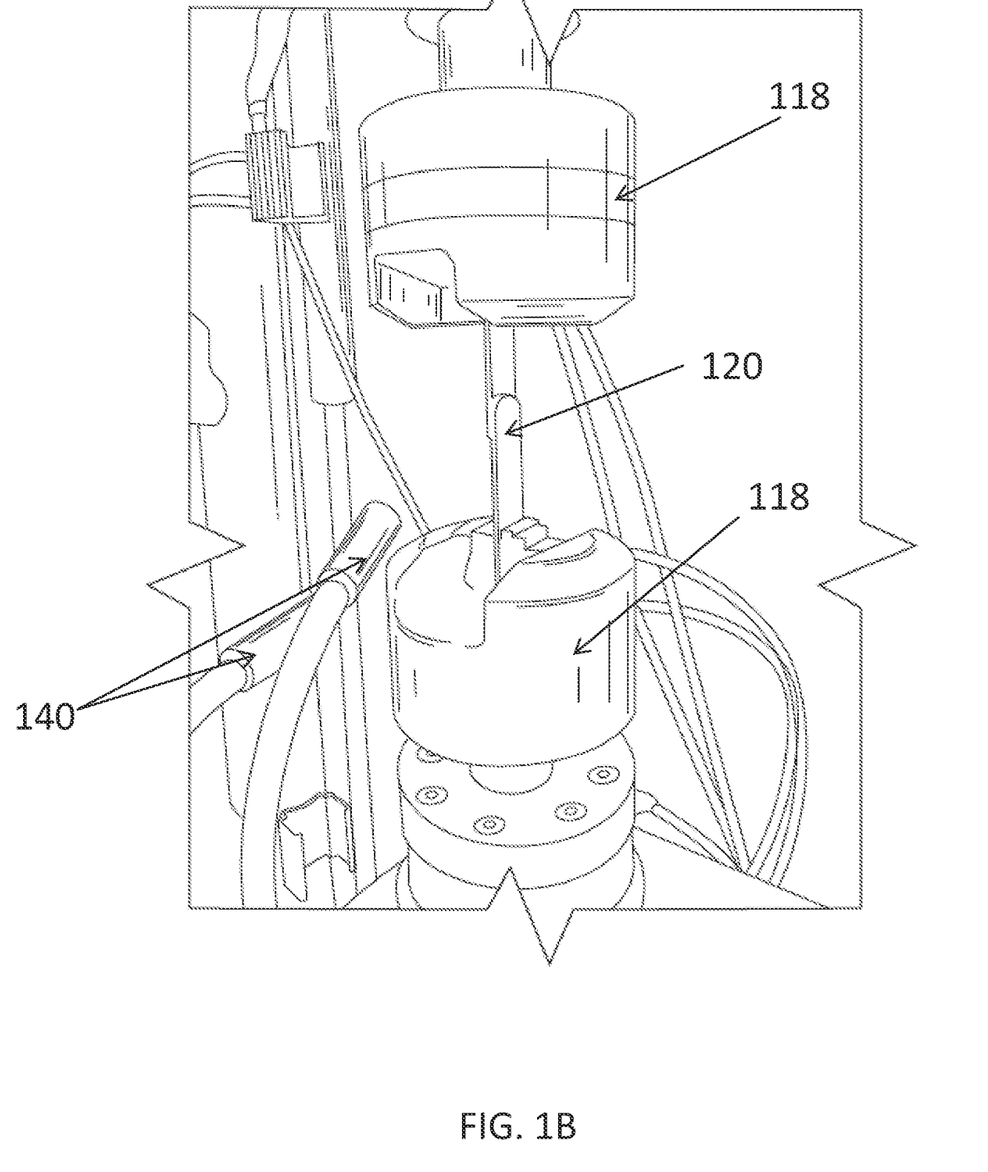
FIG. 1B is an enlarged perspective view of the adhesive joint described for FIG. 1A positioned in the table top tensile testing system.

An adhesive joint was prepared between two rectangular pieces of aluminum using a methacrylate adhesive (SCI-GRIP® SG300 Series Methacrylate, SCIGRIP Americas, Durham, N.C., United States of America). Attached over the surfaces of the joint was a small diameter LUNA fiber optic cable (LUNA Inc., Blacksburg, Va., United States of America). Similarly to the joint of FIGS. 2A and 2B, the fiber optic cable was arranged "Z" patterns, to provide stress and/or strain information in vertical, horizontal and/or angular directions. As desired, this "Z" arrangement can be changed to another arrangement or configuration, e.g., to a star pattern at 120 degrees, a 90 degree perpendicular pattern, a rectangular pattern, a circular pattern, etc., depending upon the orientation of strain components being measured to obtain full strain and corresponding stress tensors. One end of the cable was connected to an optical distributed sensor interrogator (ODiSiB) readout unit (Luna Inc., Blacksburg, Va., United States of America). FIGS. 1A and 1B show the adhesive joint positioned in a 24.45 kN table top tensile testing system (MTS 858 Table Top System, MTS Systems Corp., Eden Prairie, Minn., United States of America).

Thus, more particularly FIG. 1A shows testing system 100 wherein adhesive joint 120 is positioned between force transducers 118 of a commercial table top tensile test system 110, which further includes cross head 112 and tensile test system controller 115. The optical fiber embedded in adhesive joint 120 is too small to be seen in FIG. 1A, but is connected separately to an ODiSiB readout unit, which is also not shown. The test system can include at least one (e.g., two) digital imaging camera positioned to record digital images of the adhesive joint to perform DIC in conjunction with the strain/stress sensing using the fiber optic cable. In FIG. 1A, one digital camera 130 is positioned with the aid of a tripod to record images of adhesive joint 120 during testing. Camera 130 is connected via cables 135 to a computer or microprocessor and/or a display module for recording, storing, analyzing, and/or displaying optical images from camera 130. FIG. 1B shows an enlarged image of a portion of testing system 100, including joint 120 and force transducers 118. Light guides 140 can be used to enhance the quality of digital images to obtain superior optical images for DIC analysis.

During testing, readout from the readout unit connected to the optical fiber can showed axial strain in the adhesive joint, e.g., at 2.2 kN. The readout unit can provide an image of the joint wherein stress/strain at any location in the joint is indicated by a particular color.

Example 2

Predicting Failure Points in Metal-Metal "Smart" Joint

An adhesive joint was prepared between two rectangular pieces of aluminum using a methacrylate adhesive (SCI-GRIP® SG300 Series Methacrylate, SCIGRIP Americas, Durham, N.C., United States of America) to form an adhesive layer. Attached over the surface of the adhesive layer was a small diameter LUNA fiber optic cable (LUNA Inc., Blacksburg, Va., United States of America). The optical cable was arranged in "Z" patterns as shown for the optical fiber in FIG. 2B, to provide stress and/or strain information in vertical, horizontal, and/or angular directions. The total length of the pieces as joined was 18.73 centimeters (cm), while the width was 2.54 cm. The optical cable has a total length of about 1.15 meters. One end of the cable (i.e., corresponding to the end near location 229' of optical fiber 220' of FIG. 2B) was connected to an optical distributed sensor interrogator (ODiSiB) readout unit (Luna Inc., Blacksburg, Va., United States of America). The adhesive joint was positioned in a 24.45 kN table top tensile testing system (MTS 858 Table Top System, MTS Systems Corp., Eden Prairie, Minn., United States of America). The joint was subjected to an increasing axial tensile force of from 0 to 2.224 kN and then unloaded. While the loading was being applied and removed, data from the optical cable provided detailed strain measurements along the length of the cable. By knowing the strain at various orientations and locations, a complete strain tensor can be determined.

Figure 4A:
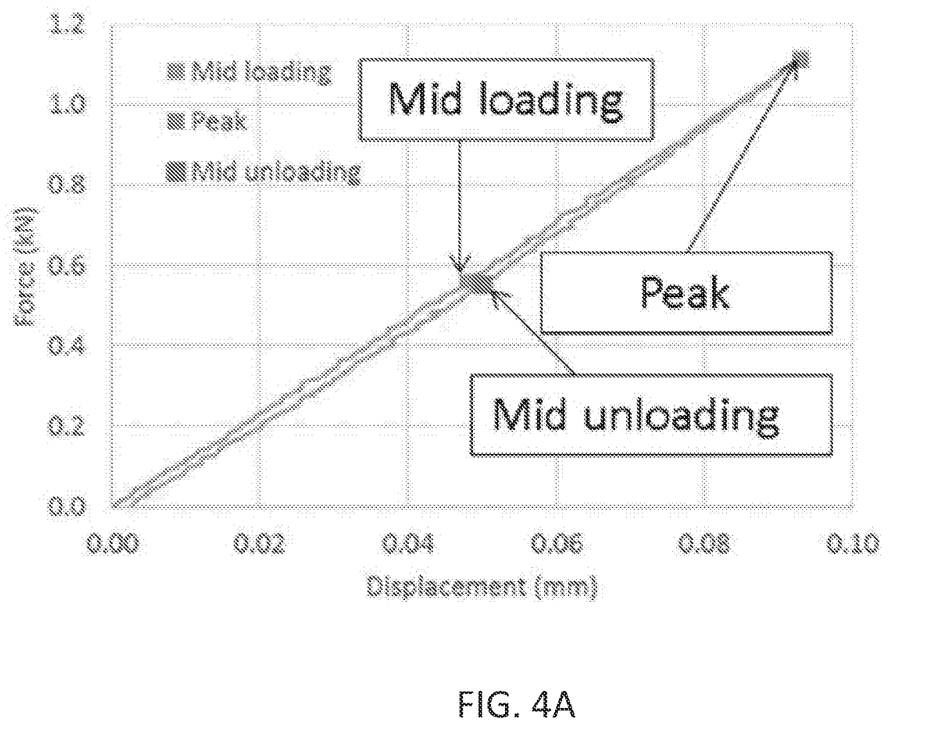
FIG. 4A is a graph showing displacement (in millimeters (mm)) measured in an exemplary adhesive joint of the presently disclosed subject matter during application of an axial tensile force. The peak applied tensile force was 2.225 kiloNewtons (kN). Displacement is also shown at the half-peak load and half-peak unload points (1.112 kN).
Figure 4B:
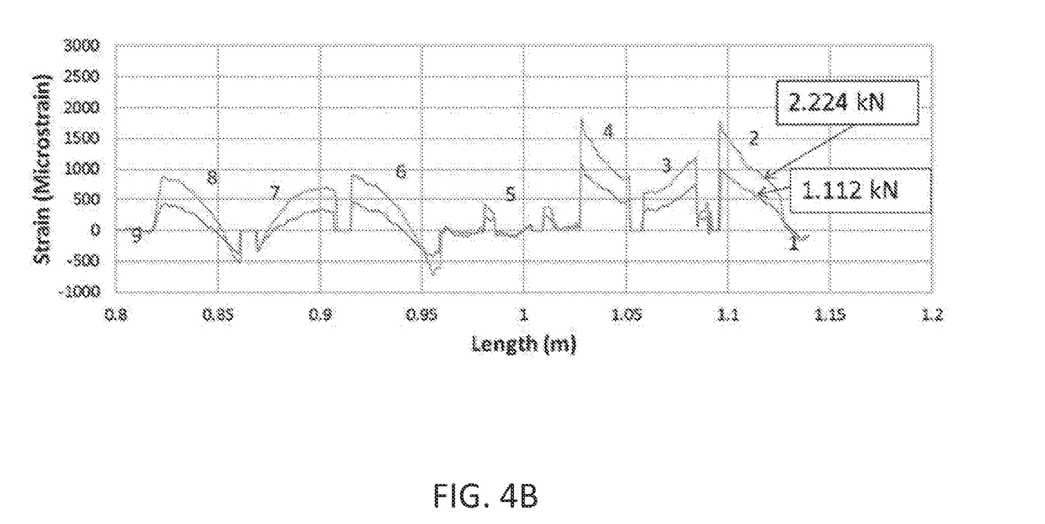
FIG. 4B is a graph of axial strain (where tension is positive strain and compression is negative strain) as a function of location in an exemplary adhesive joint of the presently disclosed subject matter while an axial force from 0 to 2.224 kiloNewtons (kN) is being applied and then unloaded.

Displacement of the two aluminum pieces was about 0.10 mm at peak loading. See FIG. 4A. As shown in FIG. 4B, axial strain (in microstrain units) was determined at several locations (1-9) along the fiber optic cable (corresponding to locations 221', 222', 223', 224', 225', 226', 227', 228', and 229' of optical fiber 220' of FIG. 2B, respectively) at peak loading (2.224 kN) and at the mid points of loading and unloading (1.112 kN). By graphing the strain as a function of location on the optical cable, it was observed there was significant spikes in strain level (e.g., at least 1000 or 1500 units) between certain, but not all, adjacent locations along the cable. The locations where spikes/optimal strain occurred (i.e., 2 and 4) can be predicted to be the points most likely to fail for these joints. Further, if the joint were to be near failure, then the peak strains will be close to a threshold valued corresponding to failure, thus providing information to evaluate the structural health of the joint It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A joint comprising at least a first component and a second component, wherein a surface of the first component and a surface of the second component are attached to one another at a joint, wherein said joint is selected from an adhesive joint or a welded thermoplastic joint, and comprising a sensing component comprising a length of optical fiber embedded in the joint and/or attached to a surface of the joint, wherein said sensing component is free of a grating etched in the optical fiber, further wherein said joint is configured to provide stress and/or strain values at one or more locations in the joint, wherein said stress and/or strain values can be provided periodically or continuously, wherein said stress and/or strain values can be determined in three dimensions.

2. The joint of claim 1, wherein the length of optical fiber traverses at least a portion of a length or a width of the joint and/or is positioned to traverse an angle between a length or a width of the joint.

3. The joint of claim 1, wherein the joint is an adhesive joint, wherein a surface of the first component and a surface of the second component are attached to one another at a joint via an adhesive layer.

4. The joint of claim 3, wherein the length of optical fiber is embedded in or attached to the adhesive layer.

5. The joint of claim 3, wherein the adhesive layer comprises a thermosetting adhesive.

6. The joint of claim 1, wherein the first component comprises a same or a different material than the second component, wherein the material of the first component and the material of the second component are each independently selected from the group consisting of a metal, concrete, stone, bone, a ceramic, a carbon fiber composite, a glass or glass composite, wood or wood based product, a thermoplastic or thermosetting polymer, and mixtures thereof.

7. The joint of claim 6, wherein at least one of the first component and the second component comprises a metal or a carbon fiber composite.

8. A method of preparing the joint of claim 1, the method comprising:
    (a) providing a first component, a second component, and a layer of uncured adhesive positioned between a surface of the first component and a surface of the second component; and
    (b) incorporating a sensing component of a sensing system, wherein the sensing component comprises a length of optical fiber and is free of a grating etched in the optical fiber, wherein the incorporating comprises (i) inserting the sensing component into the layer of adhesive during the curing of the adhesive, (ii) curing the adhesive and inserting the sensing component into the cured adhesive, and/or (iii) curing the adhesive and attaching the sensing component to a surface of the adhesive joint, a surface of the first component, and/or a surface of the second component.

9. The method of claim 8, wherein the sensing component comprises a length of fiber optic cable.

10. A method of preparing the joint of claim 1, the method comprising:
    (a) providing a first component and a second component, wherein the first and second components each comprise a thermoplastic material; and
    (b) incorporating a sensing component of a sensing system, wherein the sensing component comprises a length of optical fiber and is free of a grating etched in the optical fiber, wherein the incorporating comprises (i) configuring the sensing component between the first and second component and forming a welded thermoplastic joint between the first and second components, (ii) forming a welded thermoplastic joint between the first and second components and inserting the sensing component into the joint, and/or (iii) forming a welded thermoplastic joint between the first and second components and attaching the sensing component to a surface of the welded joint.

11. The method of claim 10, wherein the sensing component comprises a length of fiber optic cable.

12. A method of measuring stress and/or strain in a joint, the method comprising:
    (a) providing a joint comprising at least a first component and a second component, wherein a surface of the first component and a surface of the second component are attached to one another at a joint, wherein said joint is selected from an adhesive joint or a welded thermoplastic joint, further wherein said joint is configured to provide stress and/or strain values at one or more locations in the joint, wherein said stress and/or strain values can be provided periodically or continuously;
    (b) directing an optical signal into a sensing component embedded in the joint and/or attached to a surface of the joint, wherein the sensing component comprises a length of optical fiber and is free of a grating etched in the optical fiber;
    (c) detecting an optical signal emitted from the sensing component; and
    (d) processing the optical signal from (c) to determine stress and/or strain information at one or more points in the joint.

13. The method of claim 12, wherein the optical fiber is embedded in a layer of adhesive of an adhesive joint.

14. The method of claim 12, wherein the method is used to measure stress and/or strain intermittently or continuously over a period of time and/or wherein the method is used to measure stress and/or strain in three dimensions.

15. The method of claim 12, wherein the method further comprises performing digital image correlation (DIC).

16. The method of claim 12, wherein the method further comprises subjecting a predetermined force or condition on the joint of step (a), wherein the predetermined force or condition is selected from a stress, a load, a temperature, and a temperature gradient.

17. The method of claim 12, wherein the method further comprises determining the maximum load that can be exerted on the joint.

18. A system for monitoring stress and/or strain in a joint comprising:
   (a) a joint comprising at least a first component and a second component, wherein a surface of the first component and a surface of the second component are attached to one another at a joint, wherein said joint is selected from an adhesive joint or a welded thermoplastic joint; and
   (b) a sensor system comprising:
      (i) a sensing component, wherein the sensing component comprises a length of optical fiber embedded in the joint and/or attached to a surface of the joint, wherein the sensing component is free of a grating etched in the optical fiber;
      (ii) a signal source module arranged to emit a signal into the sensing component, wherein the signal source module emits an optical signal; and
      (iii) a signal detection module arranged to detect an optical signal guided from the signal source module by at least a portion of the sensing component.

19. The system of claim 18, wherein the sensor system further comprises a signal processing module, wherein the signal processing module is in communication with the signal detection module.

20. The system of claim 18, wherein an end of the length of optical fiber comprises a connector for detachably connecting the optical fiber to the signal source module and the signal detection module.

21. The system of claim 18, further comprising one or more cameras positioned to record an image of the joint.

22. The system of claim 18, further comprising a module to subject one or more locations of the joint to a predetermined force or condition, wherein the predetermined force or condition is selected from a stress, load, temperature, and a temperature gradient.

23. The system of claim 18, wherein the signal source module comprises a light emitting diode (LED) or a laser.

24. The system of claim 19, comprising an operator interface in communication with the signal processing module and/or a data visualization module in communication with the signal processing module, wherein the data visualization module is programmed to display stress and/or strain measurement data.

25. The joint of claim 2, wherein the optical fiber has an outer diameter of about 0.2 millimeters (mm) or less.

26. The joint of claim 2, wherein the optical fiber is configured in one or more W-, Z-, or S-shape.

* * * * *